US007869420B2

(12) United States Patent
Tighe et al.

(10) Patent No.: US 7,869,420 B2
(45) Date of Patent: Jan. 11, 2011

(54) METHOD AND SYSTEM FOR IN-BAND SIGNALING OF MULTIPLE MEDIA STREAMS

(75) Inventors: James Tighe, Frisco, TX (US); Frank Roland Zerangue, Jr., Dallas, TX (US); Rowan McFarland, Carrolton, TX (US)

(73) Assignee: Cisco Technology, Inc., San Jose, CA (US)

( * ) Notice: Subject to any disclaimer, the term of this patent is extended or adjusted under 35 U.S.C. 154(b) by 1257 days.

(21) Appl. No.: 11/281,104

(22) Filed: Nov. 16, 2005

(65) Prior Publication Data

US 2007/0110107 A1     May 17, 2007

(51) Int. Cl.
*H04J 3/06* (2006.01)
(52) U.S. Cl. ............ 370/350; 370/395.62; 370/507; 370/509; 386/66; 709/248
(58) Field of Classification Search ............. 370/229, 370/241, 350, 392, 395.62, 401, 503, 507, 370/304, 324, 509–514, 520; 375/145, 149, 375/240.28, 293, 354–368; 709/248; 725/32, 725/117; 379/67.1, 88.16; 455/76; 348/194; 386/12, 48, 61, 66, 71, 112
See application file for complete search history.

(56) References Cited

U.S. PATENT DOCUMENTS

| | | | | |
|---|---|---|---|---|
| 3,735,049 A * | 5/1973 | Buchner et al. | ............. | 370/229 |
| 5,537,409 A * | 7/1996 | Moriyama et al. | .......... | 370/471 |
| 5,602,992 A * | 2/1997 | Danneels | ..................... | 709/248 |
| 5,694,397 A * | 12/1997 | Burton | ........................ | 375/362 |
| 6,480,902 B1 * | 11/2002 | Yuang et al. | ................ | 709/248 |
| 7,188,353 B1 * | 3/2007 | Crinon | ........................ | 725/32 |
| 2003/0110508 A1 * | 6/2003 | Bridgelall | .................... | 725/117 |
| 2004/0052275 A1 * | 3/2004 | Murakami et al. | .......... | 370/503 |
| 2004/0090994 A1 * | 5/2004 | Lockridge et al. | ........... | 370/509 |
| 2004/0125787 A1 * | 7/2004 | May et al. | .................... | 370/350 |
| 2005/0074007 A1 * | 4/2005 | Samuels et al. | ............. | 370/392 |
| 2005/0175040 A1 * | 8/2005 | Holborow | .................... | 370/509 |
| 2005/0190777 A1 * | 9/2005 | Hess et al. | ................... | 370/401 |
| 2005/0238057 A1 * | 10/2005 | Toma et al. | ................... | 370/503 |
| 2006/0222126 A1 * | 10/2006 | Edwards et al. | ............. | 375/354 |
| 2007/0071037 A1 * | 3/2007 | Abraham et al. | ............. | 370/503 |

OTHER PUBLICATIONS

Noro et al., "Clock synchronization of MPEG-2 services over packet networks", Journal Telecommunication Systems, Springer Netherlands, Issue vol. 11, Nos. 1-2 / Mar. 1999, pp. 3-16.*
Kristiansson, Johan, et al. "Application -layer Mobility Support for Streaming Real-time Media"; Department of Computer Science & Electrical Engineering, Media Technology, Lulea University of Technology, Sweden, 2004.

* cited by examiner

*Primary Examiner*—Kwang B Yao
*Assistant Examiner*—Jeffrey M Rutkowski
(74) *Attorney, Agent, or Firm*—Fish & Richardson P.C.

(57) ABSTRACT

Methods and systems are provided for in-band signaling of at least two simultaneous digital media streams in a network, the two simultaneous streams being a part of a media session. Each of the at least two simultaneous streams is generated from a corresponding source. The generated simultaneous streams are synchronized by using a unique marker packet. Each synchronized stream is transmitted to a destination corresponding to each source.

17 Claims, 7 Drawing Sheets

METHOD AND SYSTEM FOR IN-BAND SIGNALING OF MULTIPLE MEDIA STREAMS

BACKGROUND OF THE INVENTION

1. Field of Invention

Embodiments of the invention relate in general to transmission of multiple media streams. More specifically, the embodiments of the invention relate to methods and systems enabling in-band signaling of multiple media streams in a network.

2. Description of the Background Art

Transmission of two or more real-time media streams, for example, video and audio, in a network requires the aggregation of multiple digital voice channels, for example 56 Kbit, 64 Kbit digital voice channels. This aggregation is required to provide sufficient bandwidth—typically a minimum of 128 Kbit for video. Each channel may be routed between a source and a destination through a different network path, leading to varying channel latencies.

During the process of transmission, the multiple streams may also develop a varying relationship with each other, due to differences in the processing speed of network devices. Therefore, the multiple streams have to be synchronized at the time of playback.

There are 'in-band' and 'out of band' signaling protocols for the synchronization of multiple media streams. One such in-band signaling protocol inputs data packets into all the channels at the source. Thereafter, it analyzes the data at the destination to realign the channels. The variance in channel latencies is fixed once the connection is established. However, in the case of Internet Protocol (IP) streams, every packet for any given stream may be routed through completely different network paths or may incur variable delays from end to end.

The out-of-band protocol requires an additional signal channel alongside the data transmission channel, to carry signal messages for synchronization. However, such a scheme may be susceptible to problems arising due to the possible loss of signaling messages.

Another scheme uses the concept of 'timestamps'. This scheme requires either distributed 'virtual wall clocks' or forms of virtual 'Round Trip Timestamps (RTTs)' across an unknown and ever-changing network. RTTs can drift, relative to each other, during a stream session, due to changing network dynamics, and hence may be inaccurate. If multiple related streams, such as audio, video, slides and mouse movements are used, then the complexity of using timestamps increases. Moreover, this scheme requires a connection to a dedicated timeserver, in order to maintain the virtual wall clocks.

DETAILED DESCRIPTION OF EMBODIMENTS OF THE INVENTION

Figure 1:
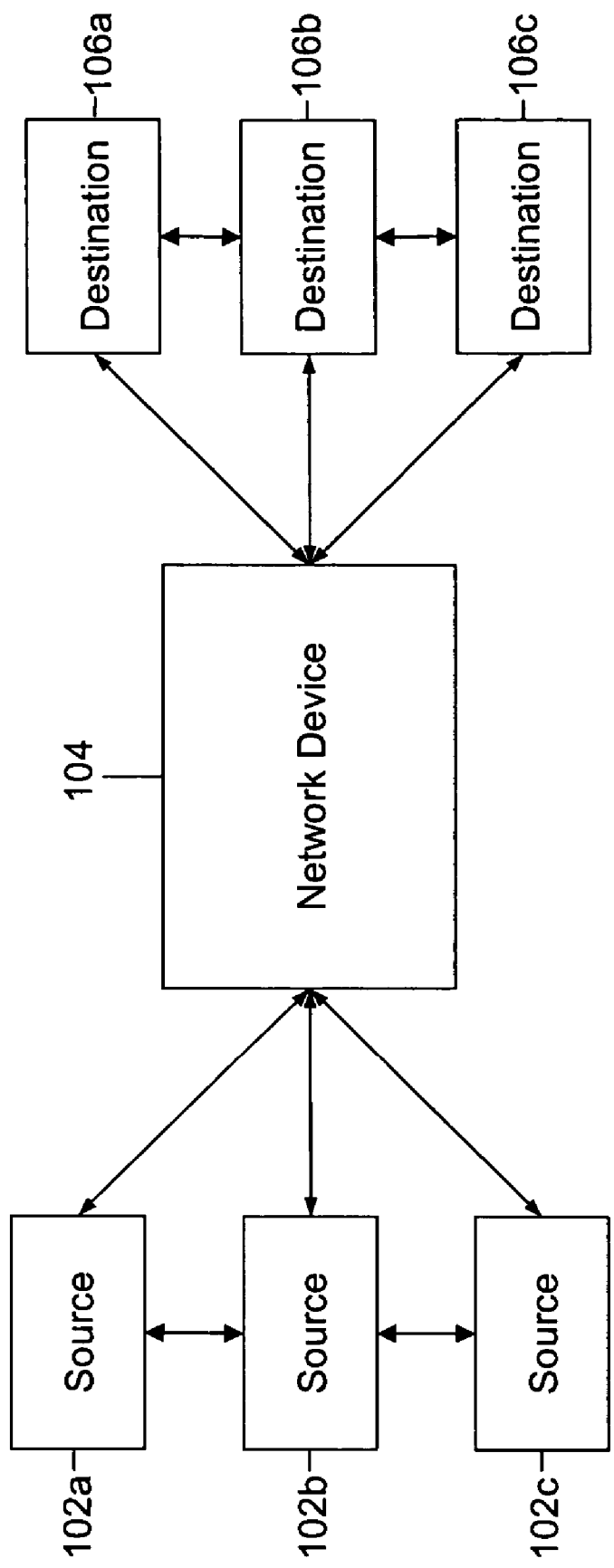
FIG. 1 illustrates an environment for in-band signaling of multiple media streams wherein various embodiments of the invention can be practiced.

Various embodiments of the invention provide methods, systems, and computer-readable media for in-band signaling of at least two simultaneous digital media streams in a network. The at least two simultaneous digital streams may relate to a media session and the streams may be generated from multiple sources. Various embodiments of the invention perform a temporal synchronization between 'N' simultaneous digital media streams relating to the media session. The synchronization is performed by embedding unique marker packets within each of the N simultaneous digital media streams. The unique marker packets are embedded simultaneously into each of the N simultaneous streams at regular intervals of time. The time is determined by configuring a source Virtual Wall Clock (VWC), which may be configured by synchronizing separate source clocks within each of the multiple sources. The synchronized streams are transmitted to multiple destinations; wherein, each of the multiple destinations corresponds to each of the multiple sources. At the corresponding destinations, the previously synchronized streams are re-synchronized, based on the embedded unique marker packets, and a destination VWC. The destination VWC is configured by synchronizing separate destination clocks on each of the corresponding destinations. After the re-synchronization, the streams are played back.

In accordance with various embodiments of the invention, the N simultaneous digital media streams may be generated simultaneously from N number of related stream-generating devices. In accordance with various embodiments of the invention, the N related stream-generating devices may be N separate Data Signaling Processors (DSPs) in the same videophone. In accordance with various embodiments, the N related stream-generating devices may be in physically separate sources. For example, for a media session with N equal to two, the related stream-generating devices may be included in an Internet Protocol (IP) phone for audio generation and in a Personal Computer (PC) for video generation. Further, these devices may be connected, for example, through a direct wire connection (802.1). The related stream-generating devices have a 'relationship', and a 'signaling path' with each other. The relationship is a temporal one, which is developed between the simultaneous streams generated by the related stream-generating devices by embedding unique marker packets within each of the simultaneous streams. The unique marker packets are embedded within each of the related simultaneous streams, at the same instance. The signaling path is the protocol capability between the related stream-generating devices, which generate the simultaneous streams. Examples of protocols include TCP. The signaling path has deterministic latencies with small, if any, variance. Considering the above example, when the IP phone is activated, it starts communicating with the related video-generating device, which is the PC, to determine a communication delay between them. Thereafter, as the related audio and video streams are generated, the unique marker packets are inserted, at appropriate locations, into the RTP streams for synchronization of the streams.

FIG. 1 illustrates an environment for in-band signaling of multiple media streams wherein various embodiments of the invention can be practiced. The environment includes sources 102 such as sources 102a, 102b and 102c; a network device 104; destinations 106, such as destinations 106a, 106b, and 106c. Sources 102, network device 104 and destinations 106 are connected through a network. The network may be, for example, a Wide Area Network (WAN) or a Local Area Network (LAN), a client-server network, a network with multi-tier architecture, or a peer-to-peer network. Each of sources 102 comprises at least one of the related stream-generating devices, which generate digital media streams corresponding to a media session. In accordance with various embodiments of the invention, sources 102 generate and synchronize 'N' simultaneous media streams corresponding to the media session, and destinations 106 receive the 'N' synchronized digital media streams. For example, for N equal to four, the synchronized media streams may include streams generated from each of the following: a video, an audio, a slide, and a mouse movement. According to an embodiment of the invention, destinations 106a, 106b, and 106c may be separate DSPs in one media-rendering device. According to another embodiment of the invention, destinations 106a, 106b, and 106c may be separate DSPs in separate media-rendering devices. However, there is the second signaling path between destinations 106.

In accordance with various embodiments of the invention, sources 102 and destinations 106 can be a data-processing unit. Examples of a data-processing unit include, but are not limited to, a mainframe computer, a supercomputer, an enterprise application server, a workstation, an embedded system, a videophone, an Internet Protocol (IP) phone, and a personal computer. The personal computer can be, for example, a desktop computer, a laptop computer, a tablet computer, a Personal Digital Assistant (PDA), a Personal Video Recorder, and a wearable computer.

Network device 104 can be a network interface between sources 102 and destinations 106. The network interface between sources 102 and destinations 106 may be of different types. Examples of network device 104 include a mixer, a bridge, a firewall, a gateway, a router, an ISDN terminal adapter, a hub, a switch, a multilayer switch, a line driver, a modem, a multiplexer, a network interface card, a protocol converter, a proxy, and so forth.

Network device 104 receives related streams and then outputs the related streams to destinations 106 at a fixed rate. In accordance with an embodiment, the fixed rate is equal to the rate of output of the related streams from sources 102. Network device 104 has an 'input packet queue' corresponding to the related streams. The related streams line up in the input packet queue at an average output rate of network device 104. If the queue becomes empty, network device 104 outputs synthesized data for the duration for which the queue is empty. In accordance with various embodiments of the invention, the synthesized data may include silence for an audio stream and a previous video frame for the video stream. When the related streams arrive at destinations 106, samples of related streams may be discarded to account for the synthesized data generated. This also holds true for lost packets of the related streams.

Sources 102 are connected to each other by means of a first signaling path. Similarly, destinations 106 are connected to each other by means of a second signaling path. Examples of the first and second signaling paths include TCP connections.

In accordance with various embodiments of the invention, the first and second signaling paths have deterministic latencies with small variances. Further, as described earlier, there exists a 'relationship' between sources 102. Similarly, there exists a 'relationship' between destinations 106.

Figure 2:
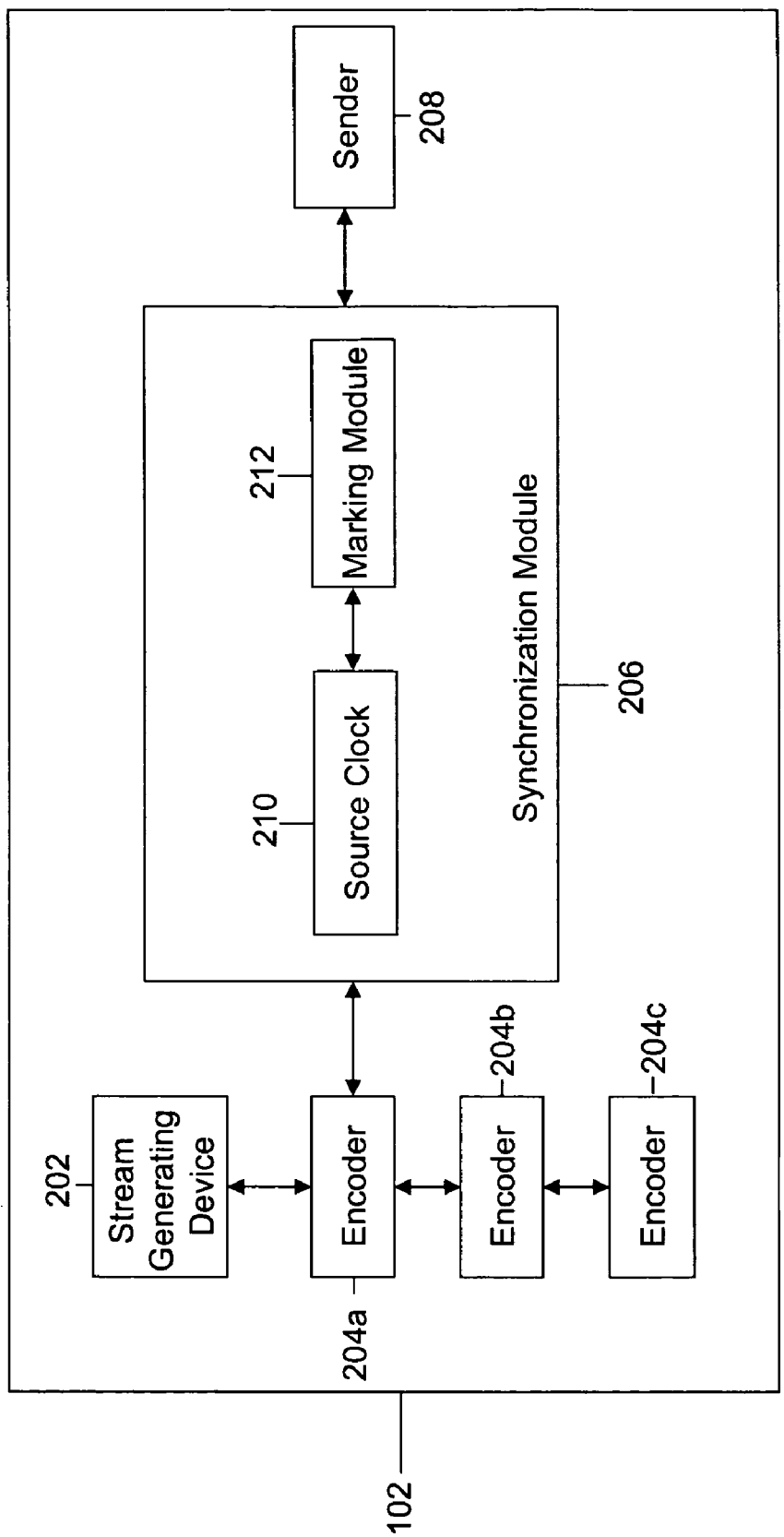
FIG. 2 illustrates a source, in accordance with an exemplary embodiment of the invention.

FIG. 2 illustrates a source, in accordance with an exemplary embodiment of the invention. Source 102 includes a stream-generating device 202, encoders 204, such as encoder 204a, 204b and 204c, a synchronization module 206, and a sender 208. Stream-generating device 202 generates media streams. Examples of stream-generating device 202 include a digital video camera, a microphone, or a web camera. Encoders 204 encode the streams generated by stream-generating device 202 for transmission. For example, encoder 204a may encode an audio stream, encoder 204b may encode a video stream, and encoder 204c may encode a stream for 'mouse-movement'. In accordance with various embodiments of the invention, the encoded streams may be compressed before transmission. For example, while the audio media stream may be compressed by using the Global System for Mobile Communication (GSM)—13 kbps, G.729 (8 kbps) and G.723.3 (both 6.4 and 5.3 kbps), and a number of propriety media compression techniques, the video media stream may be compressed by using Moving Picture Experts Group (MPEG 1), MPEG 2, MPEG 4, H.261, and H.263.

Encoders 204 encode the related streams and then send the encoded streams to synchronization module 206. Synchronization module 206 includes a source clock 210 and a marking module 212. Synchronization module 206 synchronizes the stream generated from stream-generating device 202a, with simultaneous streams generated from sources 102. Each simultaneous stream corresponds to a media session and is generated at related stream-generating devices 202 of sources 102. For example, synchronization module 206 of source 102a can synchronize the media streams generated from the related stream-generating device 202 of source 102a, with simultaneous streams generated from source 102b. Each source clock 210 within sources 102 maintains a local source time. Each marking module 212 within sources 102 intermittently embeds unique marker packets into all the streams generated by stream-generating device 202.

In accordance with various embodiments of the invention, each source clock 210 may be synchronized to a configured source 'Virtual Wall Clock' (VWC). The source VWC provides a first common clock time to sources 102. In accordance with an embodiment, the source VWC time is updated at a pre-defined time interval by means of a 'local time base synchronization technique'. For example, the synchronization of source clock 210 of source 102a, hereinafter referred to as 'S1', and source clock 210 of source 102b, hereinafter referred to as 'S2', takes place as follows:

1. S1 samples its local time base TS10
2. S1 sends a packet to S2 comprising TS10
3. S2 samples its local time base TS20
4. S2 sends a packet to S1 comprising TS20
5. S1 calculates a 'one-way trip delay', hereinafter referred to as 'dT', in each direction as follows:

$$dT = (TS11 - TS10)/2 \tag{1}$$

Where TS11 is an updated local time on S1 when dT is being calculated.

According to various embodiments of the invention, an average one-way trip delay (dTavg) is calculated for 'N' number of trips, as follows:

$$dTavg = SUM(dT1 + dT2 + \ldots + dTN)/N \tag{2}$$

6. S1 yields to S2 by correcting its local time base as follows:

$$TB1'=TB1-(TS10-TS20-dTavg) \quad (3)$$

Where TB1 is an uncorrected local time base, and TB1' is a corrected local time base. In accordance with various embodiments of the invention, the corrected local time base TB1' corresponds to the source VWC. Similarly, a destination VWC can be configured for the various destination clocks of destinations 106.

In accordance with various embodiments of the invention, the local time base synchronization technique takes into consideration a 'Round Trip Delay' (RTD) time and a 'Clock Offset' (CO) time for sending and receiving messages between source clock 210 of corresponding sources 102, through the first signaling path. The RTD and CO time can be calculated as follows:

$$RTD=(t4-t1)-(t3-t2) \quad (4)$$

$$CO=((t2-t1)+(t3-t4))/2 \quad (5)$$

Where, for example,

't1' is the local source time sampled by source clock 210 of source 102a, and it is marked on an originally sampled 64-bit timestamp that is sent to source 102b, 't2' is the local source time sampled by source clock 210 of source 102b, and it is marked on a timestamp sampled at source 102b on receiving the 64-bit timestamp from source 102a, 't3' is the time on the 64-bit timestamp at source 102b when it transmits the 64-bit timestamp to source 102a, this takes into consideration the time delay due to internal processing of source 102b, and 't4' is the time on a 64-bit timestamp at source 102a when it receives the timestamp from source 102b. This timestamp is used for updating the local time on source clock 210 of source 102a.

In accordance with various embodiments of the invention, the timestamps are normalized to the lowest precision value, based on the precision of source clock 210 of source 102 that has the lowest precision. For example, if source 102a is an IP phone and source 102b is a PC, then the timestamps would be normalized to the precision of source clock 210 of source 102a, if the precision of the IP phone were lower than that of the PC.

In accordance with various embodiments of the invention, based on the timestamps and the CO, the 'Average Clock Offset' (ACO) is determined. The ACO is determined by averaging the COs over a series of samples. For example, the number of samples considered may be at least ten. Further, the source VWC for source 102a and source 102b is configured based on the ACO, as follows:

$$VWC=t3-(\text{Average Clock Offset}) \quad (3)$$

The difference between the time of VWC and the time of source clock 102 of source 102b is transmitted to the source clock 210 of source 102a in the 'Estimated Error' field of an NTP message for the synchronization of source clock 210 of source 102a. The NTP messages are communicated between sources 102 in order to transmit time-information for the synchronization of each of source clock 210 of sources 102. In accordance with various embodiments of the invention, estimation error field may be a 32-bit fixed-point number indicating the estimated error of source clock 210 of source 102a.

Based on the first common clock time provided by the configured source VWC, marking module 212 embeds a unique marker packet into the streams generated by related stream-generating device 202. In accordance with various embodiments of the invention, the unique marker packet includes a 16-bit 'Locally Unique Identifier' (LUID), a 16-bit 'previous RTP sequence number', a 32-bit 'marker ID' value, a 16-bit 'Source media type' value, a 16-bit 'Sub Source media ID', and a 128-bit 'unique identifier'.

The 16-bit LUID is a unique identifier for each media session. Each session that is generated by sources 102 has a new ID. The session ID should be the same for all media streams of any one session on stream-generating devices 202. For example, this session ID may be generated by source 102a and communicated to other sources, such as source 102b, and source 102c. The 16-bit previous RTP sequence number corresponds to a media stream packet that the unique marker packet follows. The 32-bit marker ID value contains the sequence number of the unique marker packet. The sequence number may, for example, start from zero at the beginning of each media session and increase each time the unique marker packets are embedded into the related streams. Therefore, the related unique marker packets are uniquely tied to the related stream-generating device and unique to each session. The 16-bit source media type value contains an identifier to identify the type of media streams. For example, the type of media streams include a video, audio, television, slides, music, and window stream. The 16-bit 'Sub Source media ID' contains a unique identifier for the media streams generated from source 102a and the 128-bit unique identifier is a unique identifier for source 102a. After the unique marker packets are embedded, sender 208 of source 102, corresponding to destination 106; transmits the related streams. For example, sender 208 of source 102a transmits streams to destination 106a.

Figure 3:
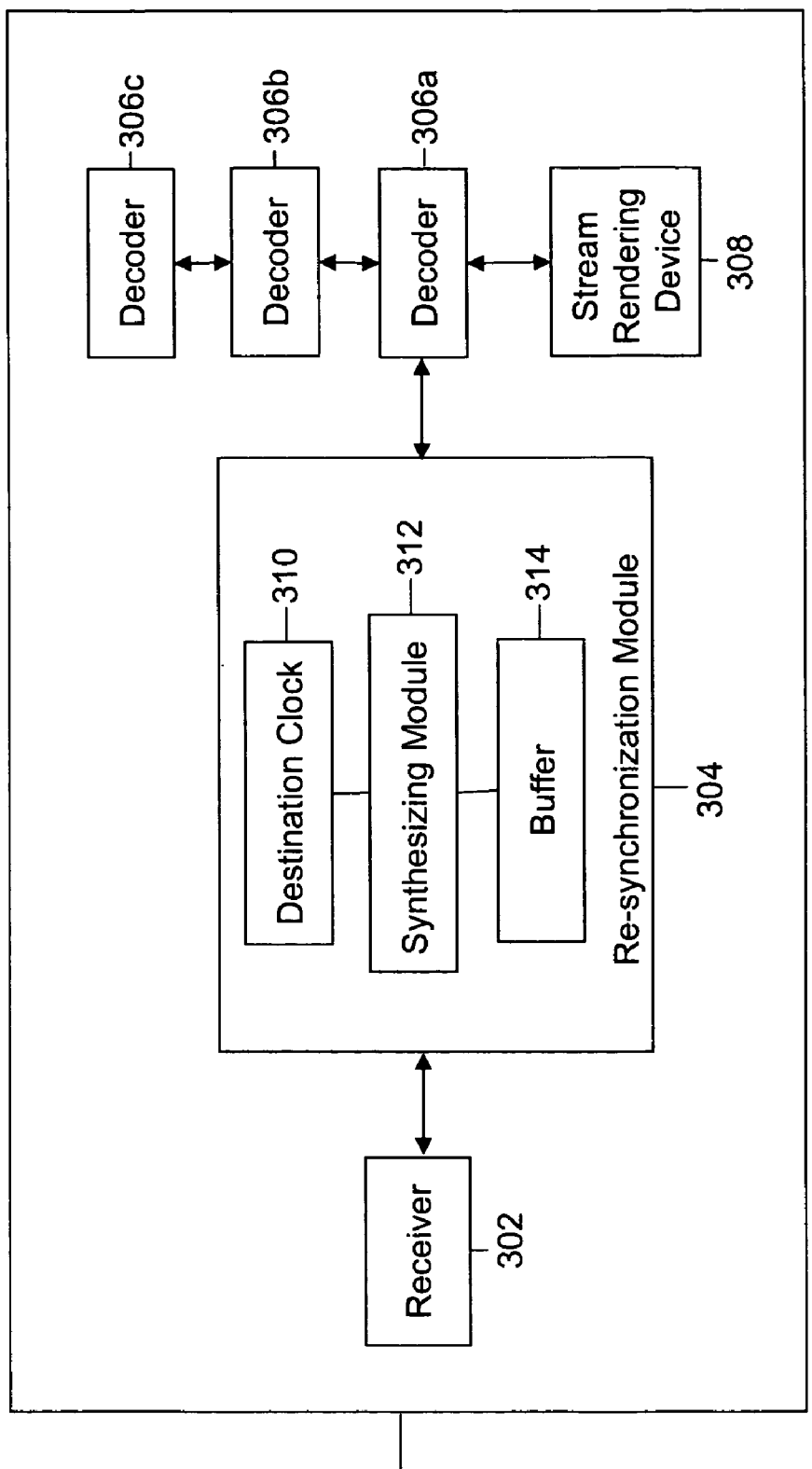
FIG. 3 illustrates a destination, in accordance with an exemplary embodiment of the invention.

FIG. 3 illustrates a destination, in accordance with an exemplary embodiment of the invention. Each destination 106 includes a receiver 302; a re-synchronization module 304; decoders 306, such as decoder 306a, 306b, 306c; and a stream-rendering device 308. Receiver 302 receives a digital media stream along with the unique marker packet that is transmitted by sender 208 of a corresponding source from sources 102. For example, receiver 302, of destination 106a, receives the stream sent by sender 208 of source 102a. Re-synchronization module 304 re-synchronizes the streams received by receiver 302, with related streams. The re-synchronization is performed by relating like unique marker packets in each related stream. The related streams are streams of the same media session, transmitted simultaneously by source 102b, source 102c, and so forth, and received at destinations such as 106b, 106c, and so forth. After receiving the related streams, receiver 302 transmits the related streams to re-synchronization module 304 for resynchronization.

Re-synchronization module 304 includes a destination clock 310, a synthesizing module 312, and a buffer 314. Destination-clocks 310 in destinations 106a, 106b, and 106c, configure a destination VWC, in order to provide a second common clock time. In accordance with an embodiment of the invention, the second common clock time of the destination VWC is updated at a pre-defined time interval by means of the 'local time base synchronization technique', as has been described earlier in the case of configuration of the source VWC.

Based on the destination VWC and the embedded unique marker packet, synthesizing module 312 synthesizes the streams received by receiver 302. For example, a synthesizing module 312 of destination 106a synthesizes the streams received by a receiver 302, of destination 106a.

Buffer 314 stores the synthesized and re-synchronized streams for play back. Stream-rendering device 308 accesses buffer 314 to play back the streams.

Decoders 306 decode the re-synchronized related streams before playback. Stream-rendering device 308 plays back the decoded streams. In accordance with various embodiments of the invention, decoders 306a, 306b, and 306c correspond to encoders 204a, 204b, and 204c, respectively.

Figure 4:
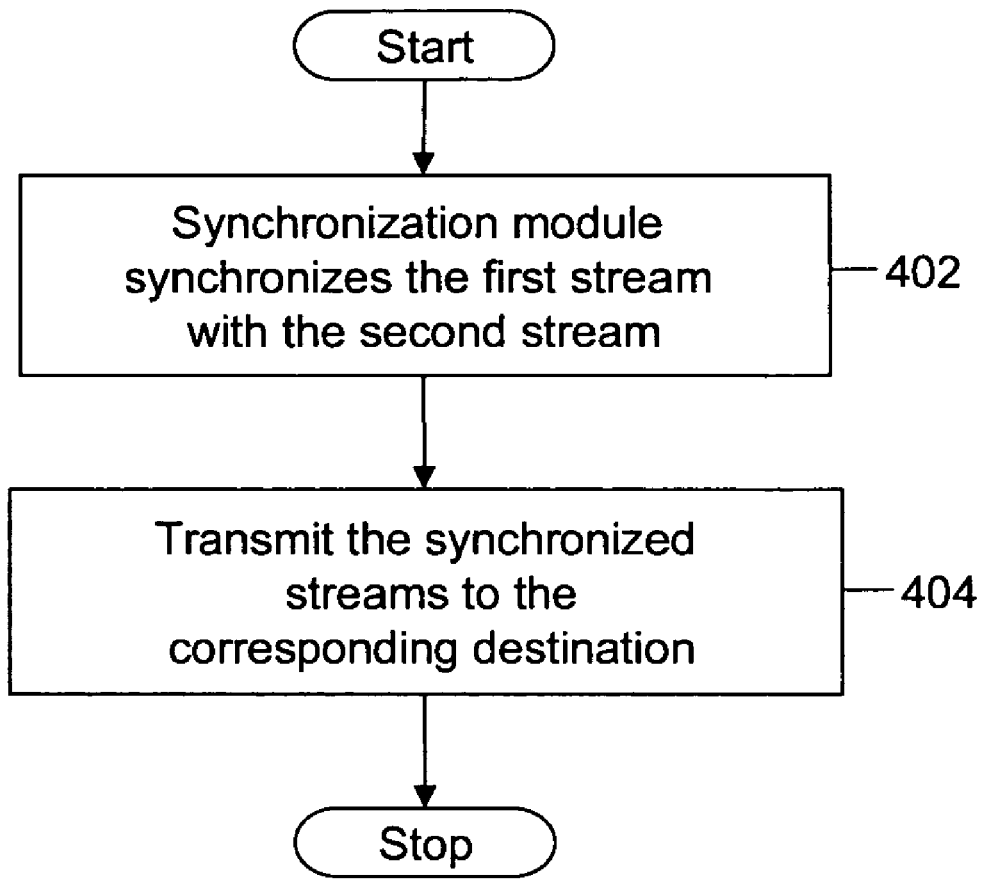
FIG. 4 is a flowchart illustrating a method for in-band signaling of at least two simultaneous digital media streams in a network, in accordance with various embodiments of the invention.

FIG. 4 is a flowchart illustrating a method for in-band signaling of at least two simultaneous digital media streams in a network, in accordance with various embodiments of the invention. At step 402, synchronization module 206 of source 102a synchronizes a first stream with a destination stream. At step 404, the synchronized streams are transmitted to corresponding destinations 106a, and 106b by the corresponding sources 102a, and 102b, respectively. The synchronized streams are transmitted by using the in-band signaling. According to the various embodiments of the invention, synchronization module 206 of sources 102 can synchronize a plurality of streams, which are generated from stream generating devices 202 of sources 102.

In accordance with various embodiments of the invention, source 102b communicates to source 102a the various additional delays, for example, for each supporting video codec. Source 102b communicates the delays by sending a 'Video Frame Decode Delay Message' to source 102a. The message includes the number of 'Codec entry pairs' that follow. One Codec entry pair includes a 'video codec type' and a corresponding 'video codec delay'. The video codec delay is the time taken by source 102b to decode a single frame for a previous video codec type of the second stream. Therefore, the video frame decode delay message is used by sources 102 in order to perform two functions: to share information about the codec supported by each of the sources 102, and, to share information about the time required for decoding a single frame of the related streams. For example, during the play-out of the related streams at destinations 106, each of the destinations 106 has the information about the type of media of the related streams and the longest delay time. Accordingly, the decoded media of the related streams is rendered in sync with reference to the actual decode time and play-out time.

In accordance with an embodiment of the invention, source clock 210 of source 102a is synchronized with source clock 210 of source 102b to configure the source VWC. As described previously, this synchronization is performed on the basis of the local time base synchronization technique. Source 102a communicates to source 102b the information about the start of media stream upon receipt or generation of an audio call. Source 102a communicates this information by sending a 'Request Marker Start Message' to source 102b. This message includes an 'audio codec type', and an 'audio frame rate'. The audio frame rate is the rate at which the audio frames of the media streams may be sent by source 102a. For example, if two frames are sent after every 20 millisecond (ms), the audio frame rate is 20 ms. Thereafter, source 102b sends a 'Marker Start Notify Message' to source 102a. This message provides information about the proper timing and location of where the unique marker packets have to be embedded in the media streams, based on the source VWC. The marker start notify message includes, for example, the next value of the source VWC, count of the number of audio packets that are to be sent between each unique marker packet, an identification value for the next unique marker packet, and the Real Time Protocol (RTP) payload type.

According to various embodiments of the invention, sender 208 of source 102a transmits a first stream to destination 106a, which may be an IP phone, and sender 208 of source 102b transmits a second stream to destination 106b, which may be a PC. Destination 106a plays out the audio media stream after an appropriate delay period. It notifies destination 106b as it reaches each marker just before play out by using a 'Play out Marker Globally Unique Identifier (GUID) Message'. This message includes a 32-bit unique marker ID. For example, the time of play-out of first stream at stream-rendering device 308 of destination 106a is performed, based on the destination VWC and the video frame decode delay message.

In accordance with various embodiments of the invention, destination 106a synchronizes with destination 106b when destination 106a receives the first unique marker packet from source 102a. Destinations 106a and 106b synchronize their respective local time base to the destination VWC. In addition, during the synchronization, destination 106a communicates to destination 106b the unique marker packet provided by source 102a. If a time-base adjustment of destination 106a is negative, with respect to the local time-base synchronization, synthesizing module 312 of destination 106a will synthesize the first stream for a 'first adjusted amount' and then begin playback of the first stream. However, if the time-base adjustment is positive, destination 106a will discard a 'second adjusted amount' from the first stream and then begin playback. This synchronizes the compensation of the first stream with the second stream.

If destination 106b has not received the second stream from source 102b, synthesizing module 312 of destination 106b begins synthesizing data and upon receiving the second stream, it discards the same by a 'third adjusted amount'. This is done to compensate for the synthesized data and the difference of time between the receipt of the beginning unique marker of destination 106a and the receipt of the beginning unique marker of destination 106b. This can be described as follows:

$$TDIS1 = (TSYN + (TS1B - TS2B)) \quad (6)$$

Where 'TDIS1' is the third adjusted amount,

'TSYN' is the amount of data that has already been synthesized by synthesizing module 312 of destination 106b, 'TS1B' is the time upon receipt of the beginning unique marker packet for the first stream, and 'TS2B' is the time upon receipt of the beginning unique marker packet for the second stream.

If destination 106b has already received the second stream it will discard a 'fourth adjusted amount' from the second stream and then begin playback. The fourth adjusted amount is calculated as follows:

$$TDIS2 = (TS1RB - TS2B) \quad (7)$$

Where 'TDIS2' is the fourth adjusted amount.

Figure 5:
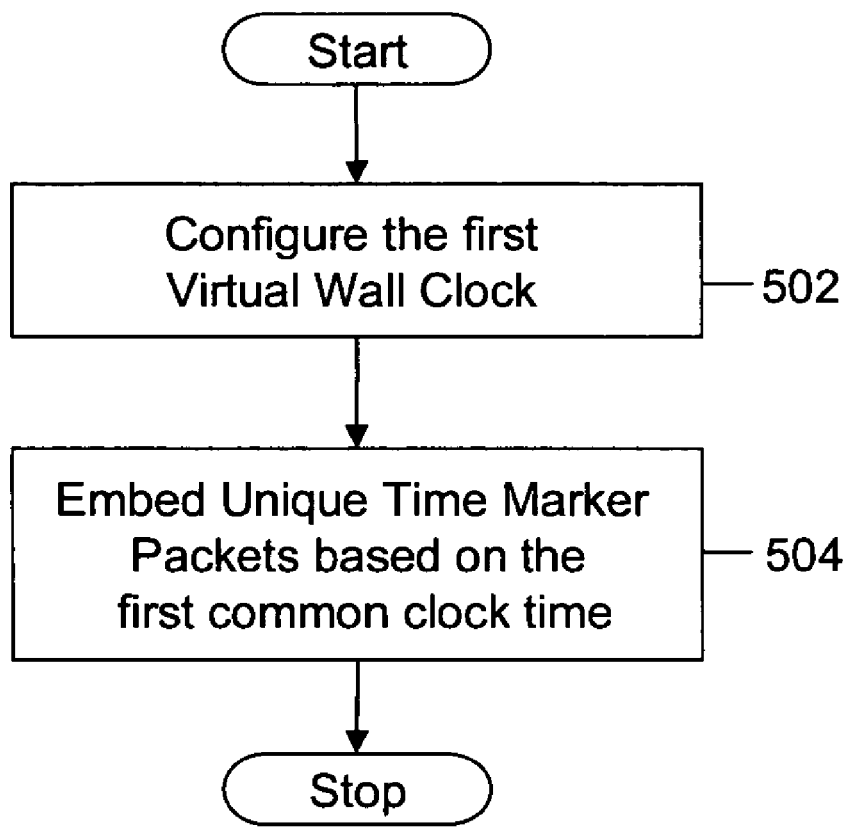
FIG. 5 is a flowchart illustrating a method for synchronizing at least two simultaneous streams, in accordance with an exemplary embodiment of the invention.

FIG. 5 is a flowchart illustrating a method for synchronizing at least two simultaneous streams, in accordance with an exemplary embodiment of the invention. At step 502, the source VWC is configured by using the local time base synchronization technique. At step 504, marking module 212 embeds a unique marker packet into all the streams generated by stream-generating device 202 at regular intervals based on the time provided by the source VWC. The unique marker packets help to synchronize the streams. These synchronized streams are then transmitted to corresponding destinations 106.

Figure 6:
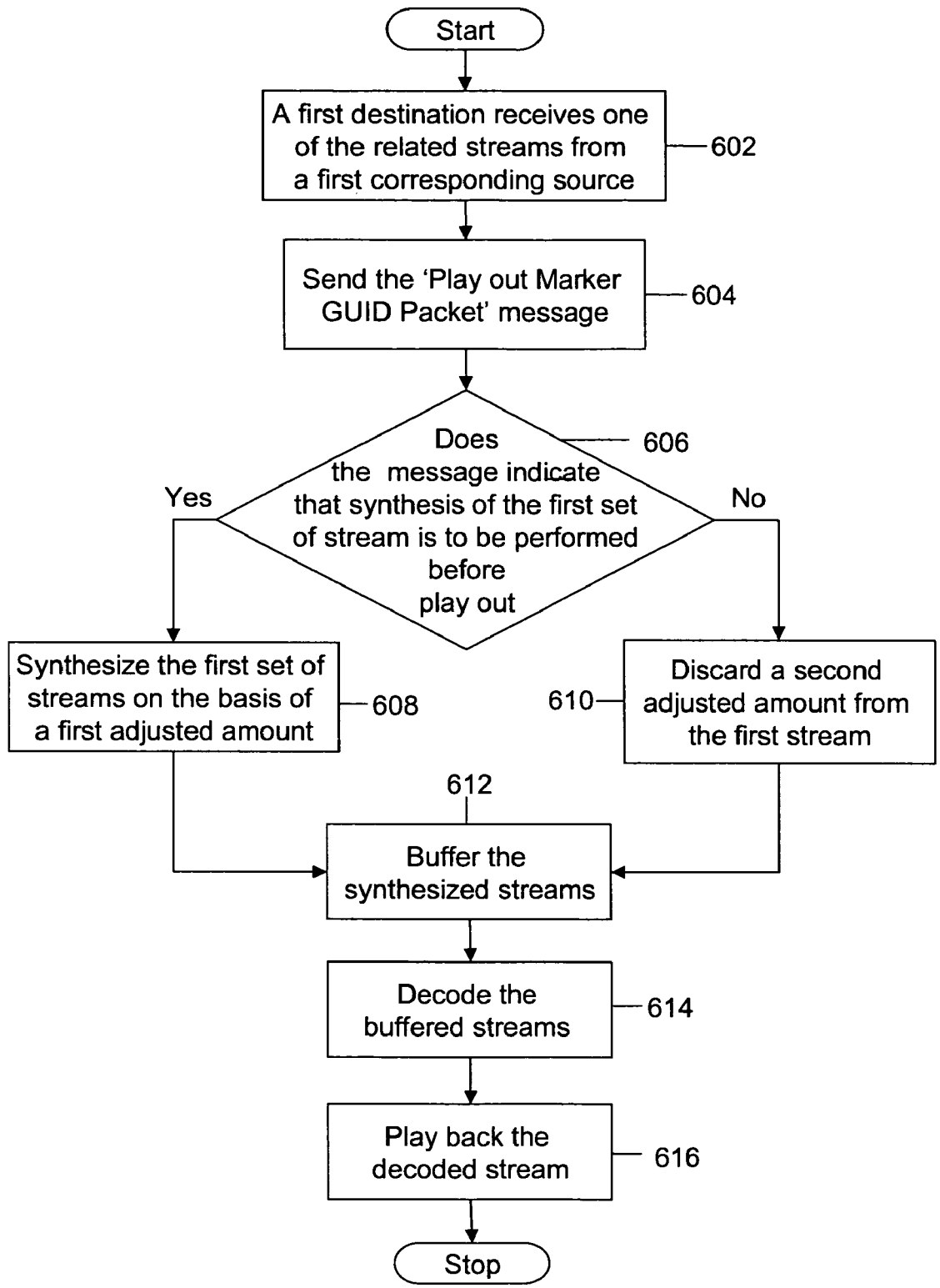
FIG. 6 is a flowchart illustrating a method for re-synchronizing the synchronized-streams, according to an exemplary embodiment of the invention.

FIG. 6 is a flowchart illustrating a method for re-synchronizing the synchronized streams, according to an exemplary embodiment of the invention. At step 602, a corresponding destination 106 receives one of the related streams from sender 208 from one of the sources 102. For example, destination 106a receives the first stream from source 102a. At step 604, synthesizing module 312 of destination 106a sends the 'Play-out Marker GUID Message' to the synthesizing module of destination 106b. At step 606, a check is performed to verify if the play-out marker GUID message indicates that synthesis of the first stream needs to be performed before the play-out. If the check performed at step 606 is true, then step 608 is performed; otherwise step 610 is performed. At step 608, synthesizing module 312 of destination 106a synthesizes the first stream, based on the play-out marker GUID message. Synthesizing implies playing a synthesized data on the basis of the first adjusted amount. At step 610, a data from the first stream is discarded by the second adjusted amount. At step 612, the streams synthesized by synthesizing module 312 are stored in buffer 314 of destination 106a. At step 614, decoders 306 of destination 106a decode the streams stored in buffer 314. At step 616, the decoded streams are played out by stream-rendering device 308.

Figure 7:
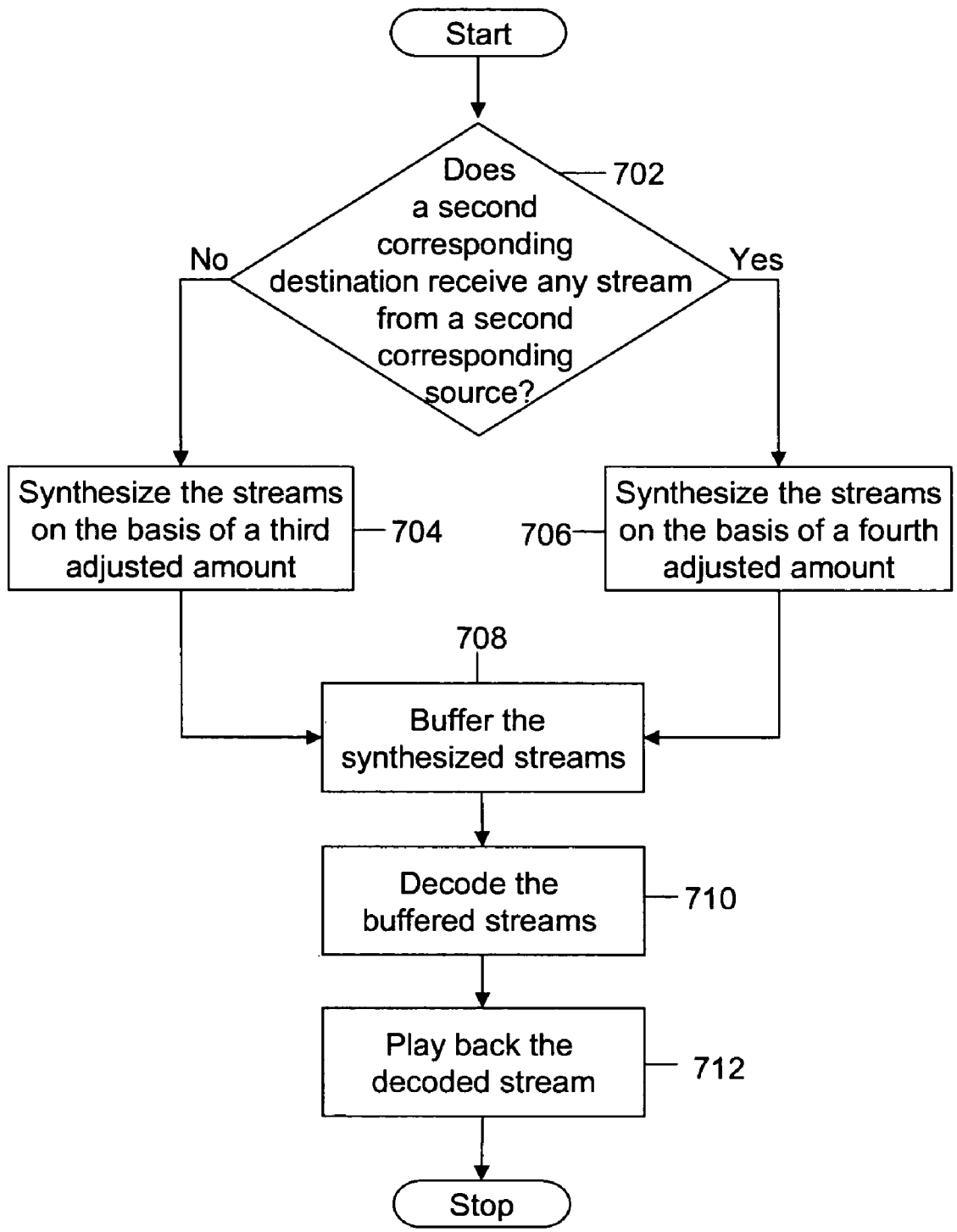
FIG. 7 is a flowchart illustrating a method for re-synchronizing the synchronized streams, according to an exemplary embodiment of the invention.

FIG. 7 is a flowchart illustrating a method for re-synchronizing the synchronized streams, according to an exemplary embodiment of the invention. At step 702, a check is performed by destination 106a to ascertain whether receiver 302 in destination 106b has received the second stream. If the check performed at step 702 is true, then step 704 is performed, otherwise, step 706 is performed. At step 704, synthesizing module 312 in receiver 302b discards data on the second stream by the third adjusted amount.

At step 706, synthesizing module 312 in destination 106b discards the data on the second stream by the fourth adjusted amount. At step 708, the streams synthesized by synthesizing module 312 are stored in buffer 314 of destination 106a. At step 710, decoders 306 of destination 106a decode the streams stored in buffer 314. At step 712, the decoded streams are played out by stream-rendering device 308.

Various embodiments of the invention provide a method for synchronizing 'N' digital media streams, which relate to one media session. The synchronization is performed by embedding unique marker packets within the simultaneous digital media streams of one media session.

Various embodiments of the invention use in-band signaling for communication between a source and a destination.

Various embodiments of the invention may be applied to various types of media that can be streamed. Further, embodiments of the invention are simple to implement and require less buffering capacity as no additional processing or encoding is required before the play back.

Embodiments of the invention do not require a connection with a dedicated timeserver in order to achieve synchronization of the simultaneous streams in a media session. Moreover, no additional processing or encoding is required to record and playback the streams in synchronization.

Although the invention has been discussed with respect to specific embodiments thereof, these embodiments are merely illustrative, and not restrictive, of the invention. For example, a 'Method and System for In-band Signaling of at least of Multiple Media Streams' can include any type of analysis, manual or automatic, to anticipate the needs for in-band signaling of multiple media streams.

Although specific protocols have been used to describe the embodiments, other embodiments can use other transmission protocols or standards. Use of the terms 'peer', 'client', and 'server' can include any type of device, operation, or any other process. The invention can operate between any two processes or entities including users, devices, functional systems, or combinations of hardware and software. Peer-to-peer networks and any other networks or systems where the roles of client and server are switched, change dynamically, or are not even present, are within the scope of the invention.

Any suitable programming language can be used to implement the routines of the present invention including C, C++, Java, assembly language, etc. Different programming techniques such as procedural or object oriented can be employed. The routines can execute on a single processing device or multiple processors. Although the steps, operations, or computations may be presented in a specific order, this order may be changed in different embodiments. In some embodiments, multiple steps shown sequentially in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing.

In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Also in the description herein for embodiments of the present invention, a portion of the disclosure recited in the specification contains material, which is subject to copyright protection. Computer program source code, object code, instructions, text or other functional information that is executable by a machine may be included in an appendix, tables, figures or in other forms. The copyright owner has no objection to the facsimile reproduction of the specification as filed in the Patent and Trademark Office. Otherwise all copyright rights are reserved.

A 'computer' for purposes of embodiments of the present invention may include any processor-containing device, such as a mainframe computer, personal computer, laptop, notebook, microcomputer, server, personal data manager or 'PIM' (also referred to as a personal information manager), smart cellular or other phone, so-called smart card, set-top box, or any of the like. A 'computer program' may include any suitable locally or remotely executable program or sequence of coded instructions, which are to be inserted into a computer, well known to those skilled in the art. Stated more specifically, a computer program includes an organized list of instructions that, when executed, causes the computer to behave in a predetermined manner. A computer program contains a list of ingredients (called variables) and a list of directions (called statements) that tell the computer what to do with the variables. The variables may represent numeric data, text, audio or graphical images. If a computer is employed for presenting media via a suitable directly or indirectly coupled input/output (I/O) device, the computer would have suitable instructions for allowing a user to input or output (e.g., present) program code and/or data information respectively in accordance with the embodiments of the present invention.

A 'computer readable medium' for purposes of embodiments of the present invention may be any medium that can contain and store the computer program for use by or in connection with the instruction execution system apparatus, system or device. The computer readable medium can be, by way of example only but not by limitation a semiconductor system, apparatus, system, device, or computer memory.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Further, at least some of the components of an embodiment of the invention may be implemented by using a programmed general-purpose digital computer, by using application specific integrated circuits, programmable logic devices, or field programmable gate arrays, or by using a network of interconnected components and circuits. Connections may be wired, wireless, by modem, and the like.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A method comprising:
   synchronizing at least two streams, each of the at least two streams is generated from a different corresponding source, the synchronization being performed using a unique marker packet in each stream, wherein the synchronizing the at least two streams comprises:
   configuring a source virtual wall clock (VWC) at each source, the source virtual wall clock being configured by determining a time stamp and an average clock offset between source clocks of each source; and
   embedding the unique marker packets within each stream of the at least two streams, the unique marker packets being embedded simultaneously based on the source VWC; and
   transmitting each of the synchronized streams to a different destination corresponding to one of the sources.

2. The method of claim 1, wherein embedding the unique marker packet comprises marking with a sequence number, the sequence number incrementing each time the unique marker packet is embedded into the streams.

3. The method of claim 1, wherein each stream is encoded before transmitting to destinations corresponding to each source.

4. The method of claim 1, wherein the synchronizing the at least two streams further comprises marking each unique marker packet with a codec indicating the type of the corresponding stream.

5. The method of claim 1, wherein the synchronizing the at least two streams further comprises marking each unique marker packet with a decode time, the decode time being the time required for decoding the corresponding stream.

6. The method of claim 1, wherein the synchronizing the at least two streams further comprises marking each unique marker packet with a globally unique identifier (GUID).

7. A method comprising:
   receiving at least two synchronized streams at destinations, each destination receiving a stream from the at least two synchronized streams from a corresponding source; and
   using a plurality of re-synchronizing modules, re-synchronizing the at least two synchronized streams, the re-synchronization being performed using a unique marker packet in each of the at least two synchronized streams and a destination virtual wall clock (VWC), wherein each of the plurality of re-synchronization modules comprises a destination clock for sampling a local destination time, wherein the re-synchronizing the synchronized streams comprises:
   if a first destination from the destinations receives a synchronized stream from the at least two synchronized streams from a corresponding first source, and a local time base adjustment of the first destination is negative with respect to a second clock time,
   then
   synthesizing the synchronized streams on the basis of a first adjusted amount, the first adjusted amount is based on the local time base adjustment of the first destination with respect to the second clock time;
   playing back the synthesized streams;

else
  if the local time base adjustment of the first destination is positive with respect to the second clock time,
  then
    discarding the synchronized streams with a second adjusted amount, the second adjusted amount is based on the local time base adjustment of the first destination with respect to the second clock time;
    playing back the synchronized streams;
  if a second destination from the destinations does not receive a synchronized stream from the at least two synchronized streams from a corresponding second source,
  then
    synthesizing the synchronized stream on the basis of a third adjusted amount, the third adjusted amount is the duration for which the second destination does not receive the synchronized stream;
    playing back the synthesized stream;
    else
      if the second destination has received the synchronized stream from the corresponding second source,
    then
    synthesizing the streams on the basis of a fourth adjusted amount, the fourth adjusted amount is based on the local time base adjustment of the first destination with respect to the second clock time; and
    playing back the synthesized streams.

8. The method according to claim 7, wherein the re-synchronized streams are played back at the destinations.

9. A system comprising:
a plurality of sources, each of the plurality of sources generating one of the at least two streams; and
a plurality of synchronization modules, each of the plurality of synchronization modules corresponding to each of the plurality of sources, each of the plurality of synchronization modules synchronizing the at least two streams, wherein each of the synchronized streams are transmitted to a different destinations corresponding to one of the sources, wherein the synchronizing the at least two streams comprises:
  configuring a source virtual wall clock (VWC) at each source, the source virtual wall clock being configured by determining a time stamp and an average clock offset between source clocks of each source; and
  embedding the unique marker packets within each stream of the at least two streams, the unique marker packets being embedded simultaneously based on the source VWC.

10. The system according to claim 9, wherein each of the plurality of synchronization modules comprises:
a source-clock for sampling a local source time; and
a marking module for marking the corresponding stream with a globally unique identifier (GUID) and a sequence number, the sequence number incrementing each time the unique marker packet is embedded into the stream.

11. The system according to claim 9, wherein each of the plurality of sources comprises:
a stream-generating device for generating one of the at least two streams;
an encoder for encoding the generated stream before synchronization; and
a sender for sending the synchronized stream to the corresponding destination.

12. The system of claim 9, wherein the system further includes at least one network device, the at least two streams are first sent to the at least one network device, the network device sending the at least two streams to the corresponding destinations.

13. A system comprising:
a plurality of destinations, each of the plurality of destinations receiving one of at least two streams; and
a plurality of re-synchronization modules, each of the plurality of re-synchronization modules corresponding to each of the plurality of destinations, each of the plurality of re-synchronization modules comprising a destination clock for sampling a local destination time, each of the plurality of re-synchronization modules re-synchronizing the corresponding stream, wherein each of the plurality of re-synchronization modules further comprises:
  a synthesizing module for synthesizing the re-synchronized stream; and
  a buffer for buffering the re-synchronized stream.

14. The system according to claim 13, wherein each of the plurality of destinations comprises:
a receiver for receiving at least one of the streams from a corresponding source;
a decoder for decoding the re-synchronized stream; and
a stream rendering device for playing back the re-synchronized stream.

15. A system comprising:
means for synchronizing the at least two streams, each of the at least two streams is generated from a different corresponding source, the synchronization is performed at each of the corresponding-sources, the synchronization is performed using a unique marker packet, wherein the means for synchronizing the at least two streams comprises:
  means for configuring a source virtual wall clock (VWC) at each source, the source virtual wall clock being configured by determining a time stamp and an average clock offset between source clocks of each source; and
  means for embedding the unique marker packets within each stream of the at least two streams, the unique marker packets being embedded simultaneously based on the source VWC; and
means for transmitting each synchronized stream to a different destination corresponding to one of the sources.

16. An apparatus comprising:
a processing system including a processor coupled to a display and user input device;
a machine-readable medium including instructions executable by the processor comprising:
one or more instructions for synchronizing the at least two streams, each of the at least two streams is generated from a corresponding source, the synchronization is performed at each of the corresponding sources, the synchronization is performed using a unique marker packet, wherein the one or more instructions for synchronizing the at least two streams comprises:
  one or more instructions for configuring a source virtual wall clock (VWC) at each source, the source virtual wall clock being configured by determining a time stamp and an average clock offset between source clocks of each source; and
  one or more instructions for embedding the unique marker packets within each stream of the at least two streams, the unique marker packets being embedded simultaneously based on the source VWC; and
one or more instructions for transmitting each of the synchronized streams to a different destination corresponding to one of the sources.

17. A non-transitory machine-readable medium including instructions executable by the processor, the machine-readable medium comprising:
- one or more instructions for synchronizing the at least two streams, the at least two streams being part of a media session, each of the at least two streams is generated from a corresponding source, the synchronization is performed at each of the corresponding-sources, the synchronization is performed using a unique marker packet, wherein the one or more instructions for synchronizing the at least two streams comprises:
- one or more instructions for configuring a source virtual wall clock (VWC) at each source, the source virtual wall clock being configured by determining a time stamp and an average clock offset between source clocks of each source; and
- one or more instructions for embedding the unique marker packets within each stream of the at least two streams, the unique marker packets being embedded simultaneously based on the source VWC; and
- one or more instructions for transmitting each of the synchronized streams to a different destination corresponding to one of the sources.

* * * * *